(12) United States Patent
Domgaard (10) Patent No.: US 6,823,656 B1
(45) Date of Patent: Nov. 30, 2004

(54) CONVERSION KIT FOR FINGER WHEEL RAKE (76) Inventor: Neal H. Domgaard, HC 67, Box 50, Fort Duchesne, UT (US) 84026

(*) Notice: Subject to any disclaimer, the term of this patent is extended or adjusted under 35 U.S.C. 154(b) by 0 days.

(21) Appl. No.: 10/693,324

(22) Filed: Oct. 24, 2003

(51) Int. Cl.⁷ .................. A01D 76/00; A01D 78/00; A01D 80/00; A01D 84/00
(52) U.S. Cl. ........................................ 56/377
(58) Field of Search ................. 56/377, 367, 365, 56/366, 375; 172/311

(56) References Cited

U.S. PATENT DOCUMENTS

| | | | | |
|---|---|---|---|---|
| 2,993,328 A | * | 7/1961 | van der Lely et al. | 56/377 |
| 4,214,428 A | * | 7/1980 | Caraway | 56/341 |
| 4,231,218 A | * | 11/1980 | Delgado | 56/377 |
| 5,956,934 A | * | 9/1999 | Wright et al. | 56/377 |
| 6,000,207 A | * | 12/1999 | Menichetti et al. | 56/365 |

OTHER PUBLICATIONS

Operator's Manual, Mounted Side–Delivery Rake (Befco, Inc., Rocky Mount, North Carolina, Date Sep. 1997).

* cited by examiner

Primary Examiner—Árpád Fábián Kovács
(74) Attorney, Agent, or Firm—Clayton, Howarth & Cannon, P.C.

(57) ABSTRACT

A conversion kit allowing most standard "V" hay rakes to be easily converted to obtain the improved performance common to trailing wheel rakes without significant modification to the original frame of the standard "V" hay rakes is disclosed. The conversion kit includes a pair of booms that are placed between the rake frame and the rake arm assemblies. These booms are stabilized by a brace. Installation of the conversion kit results in the rotating tined wheels being supported by their trailing faces instead of their leading faces.

39 Claims, 8 Drawing Sheets

CONVERSION KIT FOR FINGER WHEEL RAKE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates generally to hay rakes, and more particularly, but not necessarily entirely, to finger wheel hay rakes.

Modern finger wheel hay rakes generally comprise left and right side rake arms, each rake arm having a plurality of rotating tined wheels. A frame holds the left and right side rake arms at an angle such that the plurality of tined wheels generally form a "V" shape. When towed across a field containing cut crops, such as hay, the plurality of rotating tined wheels on the left and right side rake arms form a windrow from the cut crops. A baler may then be used to bale the cut crops.

The left and right side rake arms are generally supported by a left and a right housing assembly attached to the frame. Each of the housing assemblies may be adjustable in order to adjust the angle of the "V" formed by the left and right rake arms. The housing assemblies may also be connected to a hydraulic system allowing adjustment of the rake arms during use. In addition, the hydraulic system may allow the rake arms to be raised to facilitate transport.

Each of the rake arms provides a plurality of hubs, a single rotating tined wheel being attached to each hub. The hubs allow each of the rotating tined wheels to rotate when the hay rake is pulled across the field.

On a standard hay rake, the rake arms typically support the plurality of rotating tined wheels from the inside of the "V" formed by the plurality of rotating tined wheels. The leading face of each of the rotating tined wheels is attached to one of the hubs. This configuration, however, has been found to be less desirable due to the fact that the standard hay rake has difficulty operating on wet or heavy crops thereby leading to diminished performance under these conditions.

More recently, it has been found that better results may be achieved over the standard hay rake by supporting the plurality of rotating tined wheels from the outside of the "V" instead of from the inside. In this regard, the trailing faces of the rotating tined wheels are attached to the hubs. These types of rakes are often called trailing wheel rakes due to the fact that one or more wheels are positioned behind the rake arms for support. While trailing wheel rakes may be more efficient than the standard hay rakes, they are generally considerably more expensive than the standard hay rakes currently available on the market today.

In view of the above, there is a need for a low-cost solution to easily convert existing standard hay rakes such that the less desirable features are reduced or eliminated. In particular, this need includes reorientating the rake arms such that the rotating tined wheels are supported from their trailing faces (outside of the "V") instead of from their leading faces (inside of the "V").

The features and advantages of the invention will be set forth in the description which follows, and in part will be apparent from the description, or may be learned by the practice of the invention without undue experimentation. The features and advantages of the invention may be realized and obtained by means of the instruments and combinations particularly pointed out in the appended claims.

BRIEF DESCRIPTION OF THE DRAWINGS

The features and advantages of the invention will become apparent from a consideration of the subsequent detailed description presented in connection with the accompanying drawings in which.

DETAILED DESCRIPTION OF THE INVENTION

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

It must be noted that, as used in this specification and the appended claims, the singular forms "a," "an," and "the" include plural referents unless the context clearly dictates otherwise. In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps.

Applicant has discovered a conversion kit that allows most standard hay rakes to be easily converted to obtain the improved performance common to a trailing wheel rake without significant modification. This conversion kit reorients the rake arms to change the support for the rotating tined wheels from the inside of the "V" to the outside of the "V." This reorientation is accomplished by interposing a boom between the frame and each of the rake arms. The booms allow the rake arms to be repositioned to support the rotating tined wheels from trailing face (outside of the "V") instead of the leading face (inside of the "V"). One type of hay rake that may be converted is a finger rake manufactured by BEFCO, Inc. (Rocky Mount, N.C.). Several embodiments of the present invention will be described below.

Figure 1:
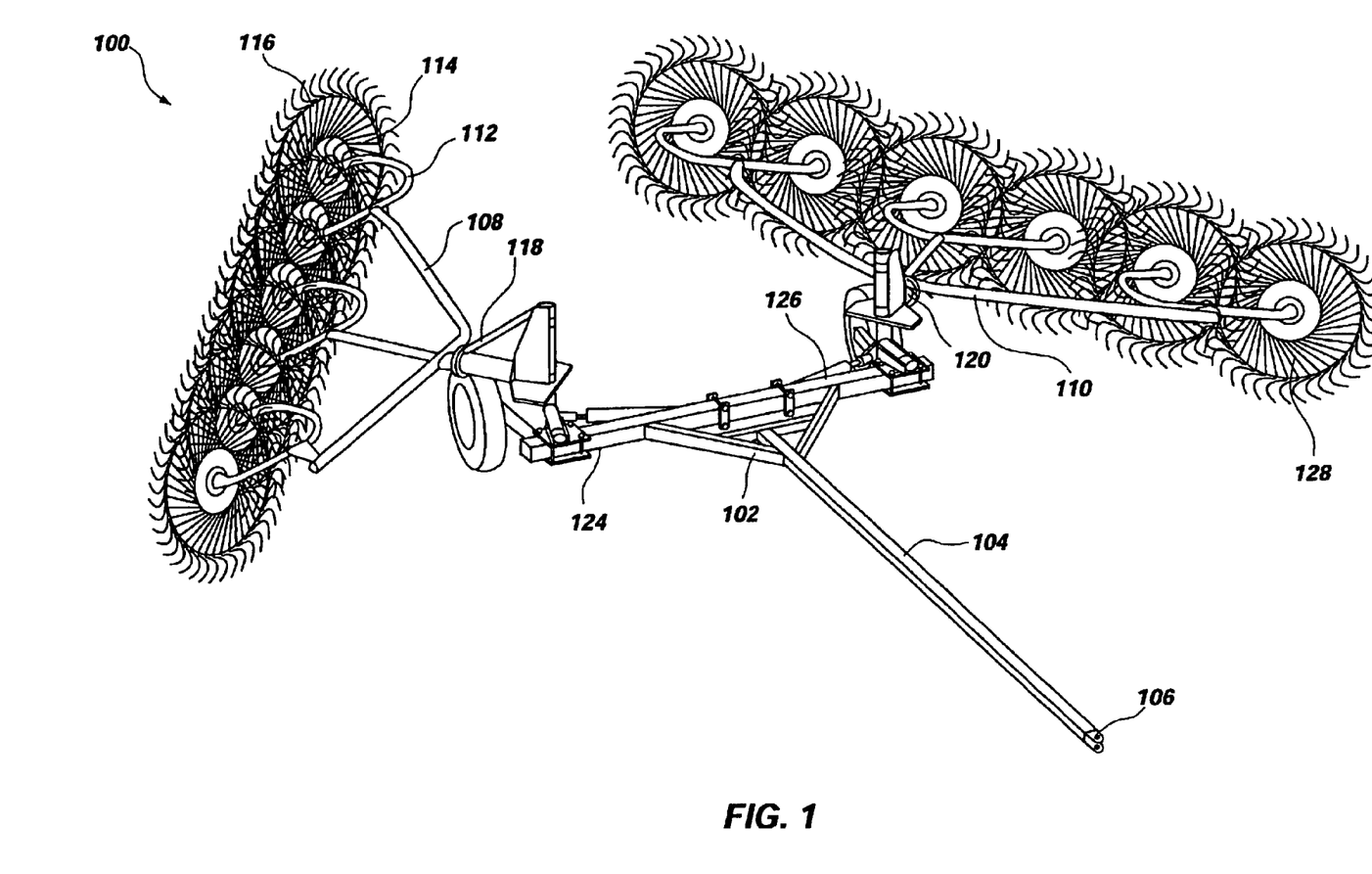
FIG. 1 is an isometric view of a standard hay rake supporting the tined wheels from the leading face.

Referring now to FIG. 1, there is shown generally a hay rake 100 that is currently available on the market. The hay rake 100 comprises a frame 102. The frame 102 comprises a tongue 104 having a hitch 106 at its free end that may be attached to any vehicle such as a tractor whereby the hay rake 100 may be pulled through a field. Attached to the frame 102 is a left rake arm 108 and a right rake arm 110. Each of the rake arms, 108 and 110, may further comprise one or more branches 112. A hub 114 is disposed at the end of each branch 112. A rotating tined wheel 116 may be mounted on each hub 114 that allows the rotating tined wheel 116 to freely spin when the hay rake 100 is pulled through a field.

An extended portion (not shown) of the left rake arm 108 and the right rake arm 110 are respectively slidably inserted into a left housing 118 and a right housing 120 attached to said frame 102. The left housing 118 and the right housing 120 may comprise a hollow tube in which the extended portions of the left rake arm 108 and the right rake arm 110 may be inserted.

The frame 102 may further comprise a left hydraulic lift 124 and a right hydraulic lift 126 connected respectively to the left housing 118 and the right housing 120 whereby the left rake arm 108 and the right rake arm 110 may be adjusted during use or raised into an upright position to facilitate transport.

As mentioned above, both the left rake arm 108 and the right rake arm 110 each comprise a plurality of rotating tined wheels 116. The left rake arm 108 and the right rake arm 110 are positioned at an angle such that the plurality of rotating tined wheels 116 form a "V" shape. A leading face 128 of each of the plurality of tined wheels 116 is connected to one of the hubs 114. The leading face 128 faces forward toward the interior of the "V" shape, roughly the direction of travel, formed by the plurality of rotating tined wheels 116.

Figure 8:
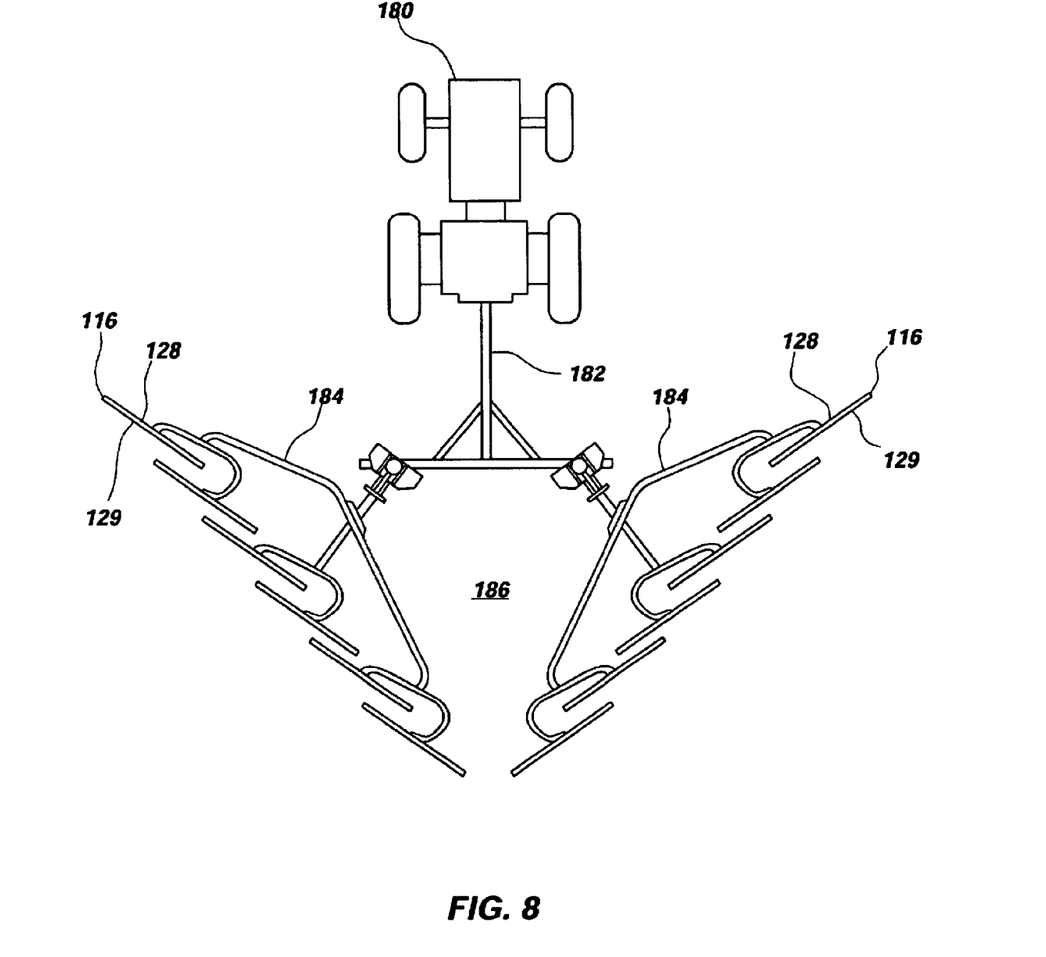
FIG. 8 is a diagram of an unconverted hay rake being pulled by a tractor.

This concept is more readily seen in the conceptual diagram shown in FIG. 8. A tractor 180 is represented pulling a hay rake 182. The hay rake 182 has a pair of rake arms 184, each of the rake arms 184 having a plurality of rotating tined wheels 116 attached thereto. As can be observed, the plurality of rotating tined wheels 116 form a "V" shape having an interior portion indicated by the reference numeral 186. The leading faces 128 of the plurality of rotating tined wheels 116 face towards this interior portion 186. As can also be observed, in the configuration shown in FIG. 8, each of the plurality of rotating tine wheels 116 is supported from the rake arms 184 by its leading face 128. A trailing face 129 of each of the plurality of rotating tined wheels 116 faces away from the interior portion 186.

Figure 2:
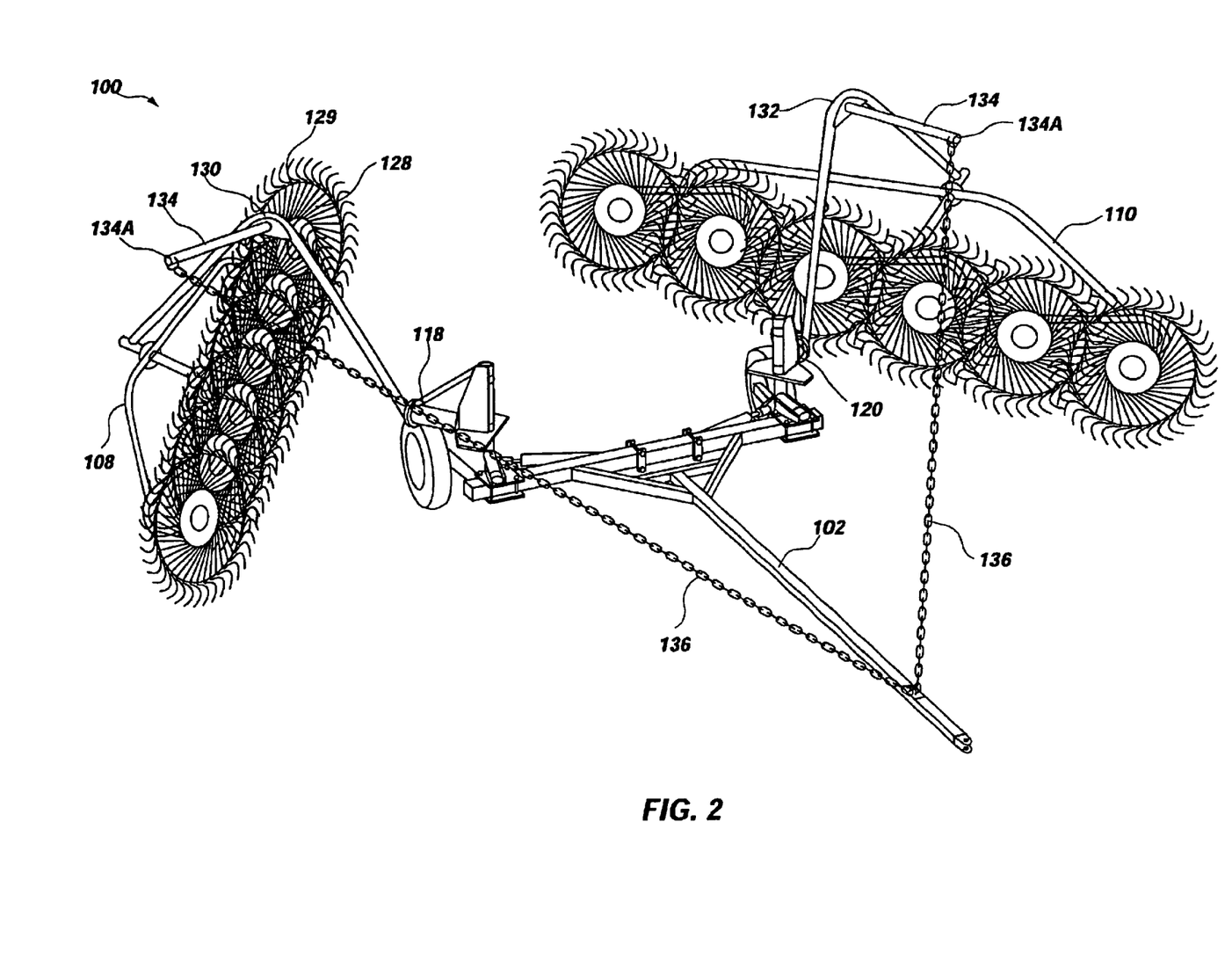
FIG. 2 is an isometric view of the hay rake in FIG. 1 that has been converted to support the tined wheels from the trailing face pursuant to the features of the present invention.

FIG. 2 illustrates the hay rake 100 in FIG. 1 having both its left rake arm 108 and right rake arm 110 reoriented in accordance with the features of the present invention. In particular, a left boom 130 has been interposed between the left housing 118 and the left rake arm 108. A right boom 132 has been interposed between the, right housing 128 and the right rake arm 110. Both the left boom 130 and the right boom 132 pass over their respective rake arms, 108 and 110.

The plurality of rotating tined wheels 116 disposed on the left rake arm 108 and the right rake arm 110 may still form a "V" shape, but it will be appreciated that the rotating tined wheels 116 are now supported from their trailing faces 129 instead of their leading faces 128.

Figure 9:
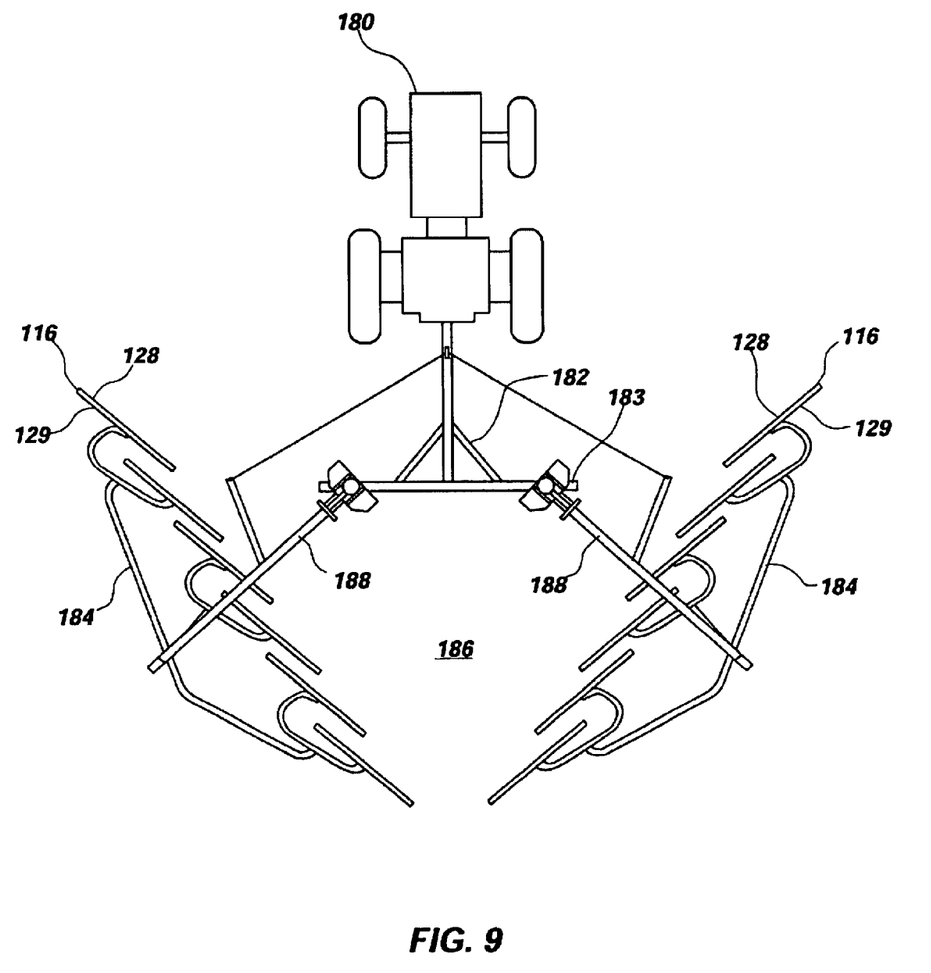
FIG. 9 is a diagram of a converted hay rake being pulled by a tractor.

Again, this concept is more readily seen in the conceptual diagram shown in FIG. 9. The tractor 180 is represented pulling the hay rake 182. The hay rake 182 has a pair of rake arms 184, each of the rake arms 184 having a plurality of rotating tined wheels 116 attached thereto. As can be observed, the plurality of rotating tined wheels 116 form a "V" shape having an interior portion indicated by the reference numeral 186. A pair of booms 188 are interposed between the rake arms 184 and the hay rake frame 183. As can be observed, each of the plurality of rotating tined wheels 116 is supported from the rake arms 184 by its trailing face 129 instead of its leading face 128 as shown in FIG. 8.

Referring now back to FIG. 2, it should be noted that in some cases it may be necessary to swap or otherwise move the left rake arm 108 and the right rake arm 110 during reconfiguration in order to assure that a "V" shape is formed and the plurality of rotating tined wheels 116 are oriented properly. This may include swapping the sides such that the rake arms are located on the other side compared to the original configuration.

It should further be noted that the leading faces 128 and is trailing faces 129 of the plurality of rotating tined wheels 116 may be independent of the actual orientation of each of the tined wheels 116. As used herein, the leading face 128 refers to the side of each of the rotating tined wheels 116 that faces towards the interior portion 186 (FIGS. 8 and 9), or the inside of the "V" shape, and the term trailing face 129 refers to the side of each of the rotating tined wheels 116 that faces away from the interior portion 186 (FIGS. 8 and 9), or the outside of the "V" shape.

It will be appreciated that one side of a tined wheel 116 may be the leading face 128 in one configuration and the trailing face 129 in another configuration. However, in other instances, it may be necessary to remove each of the rotating tined wheels 116 from the hubs 114 and reinstall them facing the other direction. In this manner, a particular side of a rotating tined wheel 116 that is a leading face 128 in one configuration may remain the leading face 128 in another configuration. The same applies to the trailing face 129.

For convenience, the following discussion regarding FIGS. 3, 4, 5 and 6 refer to the right boom 132 and its corresponding interrelated elements. It will be understood that the same discussion applies equally to the left boom 130 and its corresponding interrelated elements except where specifically noted. The only minor differences between the left boom 130 and the right boom 132 relate to being located on the left and right sides which may require some of the elements to be switched depending on the side which the boom is located.

Figure 3:
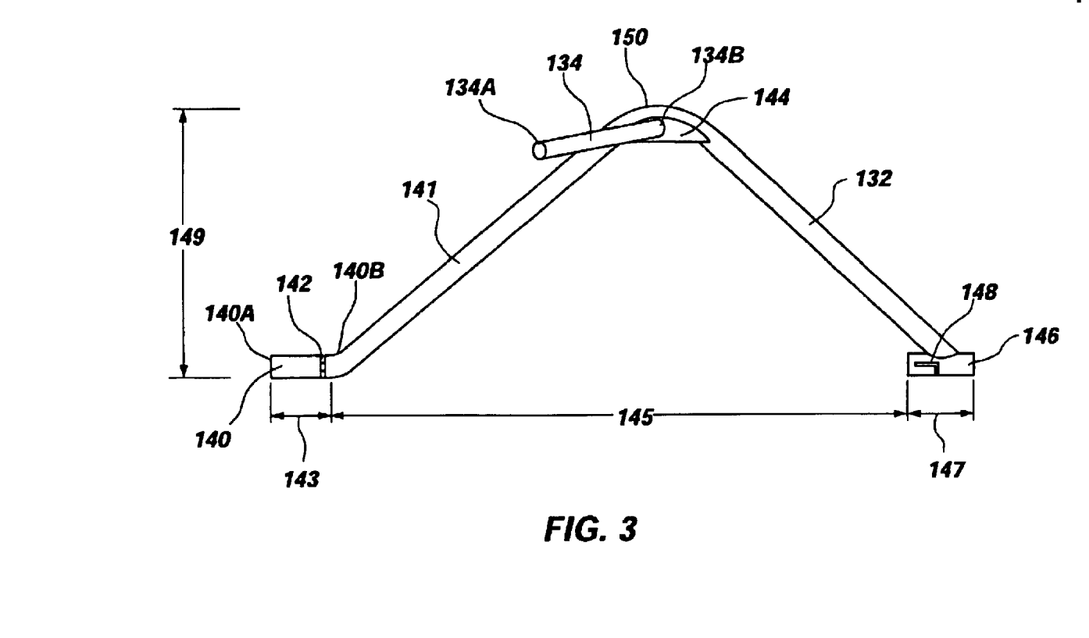
FIG. 3 is a side view of an exemplary right boom used to reorient a rake arm.
Figure 4:
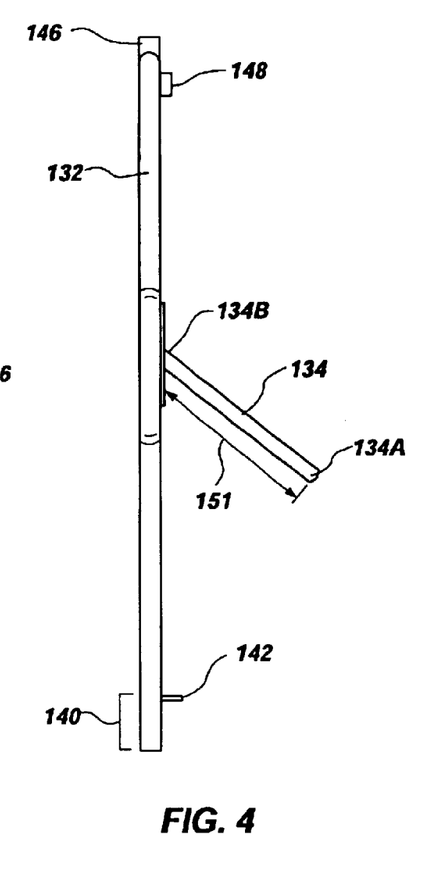
FIG. 4 is a top view of the exemplary right boom shown in FIG. 3.

Referring now to FIGS. 3 and 4, there is shown a side view and a top view, respectively, of an exemplary right boom 132 in accordance with one embodiment of the present invention. The right boom 132 may be generally composed of tubular metal or some other substance of similar strength. The right boom 132 may comprise an extended portion 140, and arched portion 141, and a boom housing 146. Each of these will be explained below.

The extended portion 140 is located at one end of the right boom 132. The extended portion 140 is adapted to enter into the right housing 120 in place of the extended portion of the right rake arm 110. The extended portion 140 may have a free end 140A and a distal end 140B, the free end 140A being inserted into the right housing 120 on the frame 102. The extended portion 140 may have a circular cross section. The length of the extended portion 140, represented by the double arrow marked with reference numeral 143 in FIG. 3, should be sufficient to adequately support the right boom 132 and the right rake arm 110. In one embodiment, the length of the extended portion is about 12 inches (30.48 cm). The extended portion 140 may be composed of 3 inch (7.62 cm) OD pipe.

A flange 142 is disposed at the distal end 140B of the extended portion 140. As will be explained below, the flange 142 may be used to secure the right boom 132 to the right housing 120. In addition, the flange 142 may have a notched portion 158 (see FIG. 5). The flange 142 may be welded onto the distal end 140B. The flange 142 may also serve as a stop when inserting the free end 140A of the extended portion 140 into the right housing 120.

As can be best seen in FIG. 3, the right boom 120 has an arched portion 141 extending upwardly from each of the right boom 120 ends to form an apex 150. A support brace 144 may be used to provide additional support at the apex 150. It will be appreciated that the apex 150 should be of sufficient height, represented by the double arrow marked with reference numeral 149 in FIG. 3, to allow the right boom 120 to pass over the right rake arm 110 as shown in FIG. 2 when the right boom 120 is installed on the frame 102 to thereby allow unfettered operation of the rotating tined wheels 116. In one embodiment, the height is about 30 inches (76.2 cm). The arched portion 141 may be composed of 2⅞ inch (7.3 cm) OD pipe.

The spanning distance of the arched portion 141, represented by the double arrow marked with reference numeral 145 in FIG. 3, should be sufficient to allow adequate clearance of the rotating tined wheels 116 and the frame 102. In one embodiment, the spanning distance is about 90 inches (228.6 cm).

A cantilevered arm 134 having a free end 134A and an attached end 134B extends outwardly from the right boom 132 at approximately the apex 150. The attached end 134B may be welded onto the right boom 132. The cantilevered arm 134 may be straight as can be seen in FIG. 4 but also may be swept back. As will be further explained below, a brace member 136 may be attached to the free end 134A of the cantilevered arm 134 to provide additional support for the additional weight of the right boom 132.

The length of the cantilevered arm 134, represented by the double arrow marked with reference numeral 151 in FIG. 4, should be sufficient to provide adequate leverage to support the right boom 132. In one embodiment, the length of the cantilevered arm 134 is about 3 feet (91.44 cm). The cantilevered arm 134 may be composed of 2 inch (5.08 cm) OD pipe.

At the opposite end from the extended portion 140 of the right boom 132 is disposed a boom housing 146. The boom housing 146 serves as an alternative point of attachment for the right rake arm 110. The boom housing 146 comprises a hollow tube in which the extended portion of the right rake arm 110 may be inserted. The length of the boom housing 146, represented by the double arrow marked with reference numeral 147, should be sufficient to support the right rake arm 110. In one embodiment, the length of the boom housing 146 is about 12 inches (30.48 cm). The boom housing 146 may be composed of 3½ inch (8.89 cm) OD pipe.

The boom housing 146 may also comprise a bracket 148. As will be explained below, the bracket 148 is used to removably secure the right rake arm 110 to the right boom 132.

It will be appreciated that the structure and apparatus disclosed herein is merely one example of a means for reorientating the rake arms, and it should be appreciated that any structure, apparatus or system for reorientating the rake arms which performs functions the same as, or equivalent to, those disclosed herein are intended to fall within the scope of a means for reorientating the rake arms, including those structures, apparatus or systems for reorientating the rake arms which are presently known, or which may become available in the future. Anything which functions the same as, or equivalently to, a means for reorientating the rake arms falls within the scope of this element.

Figure 5:
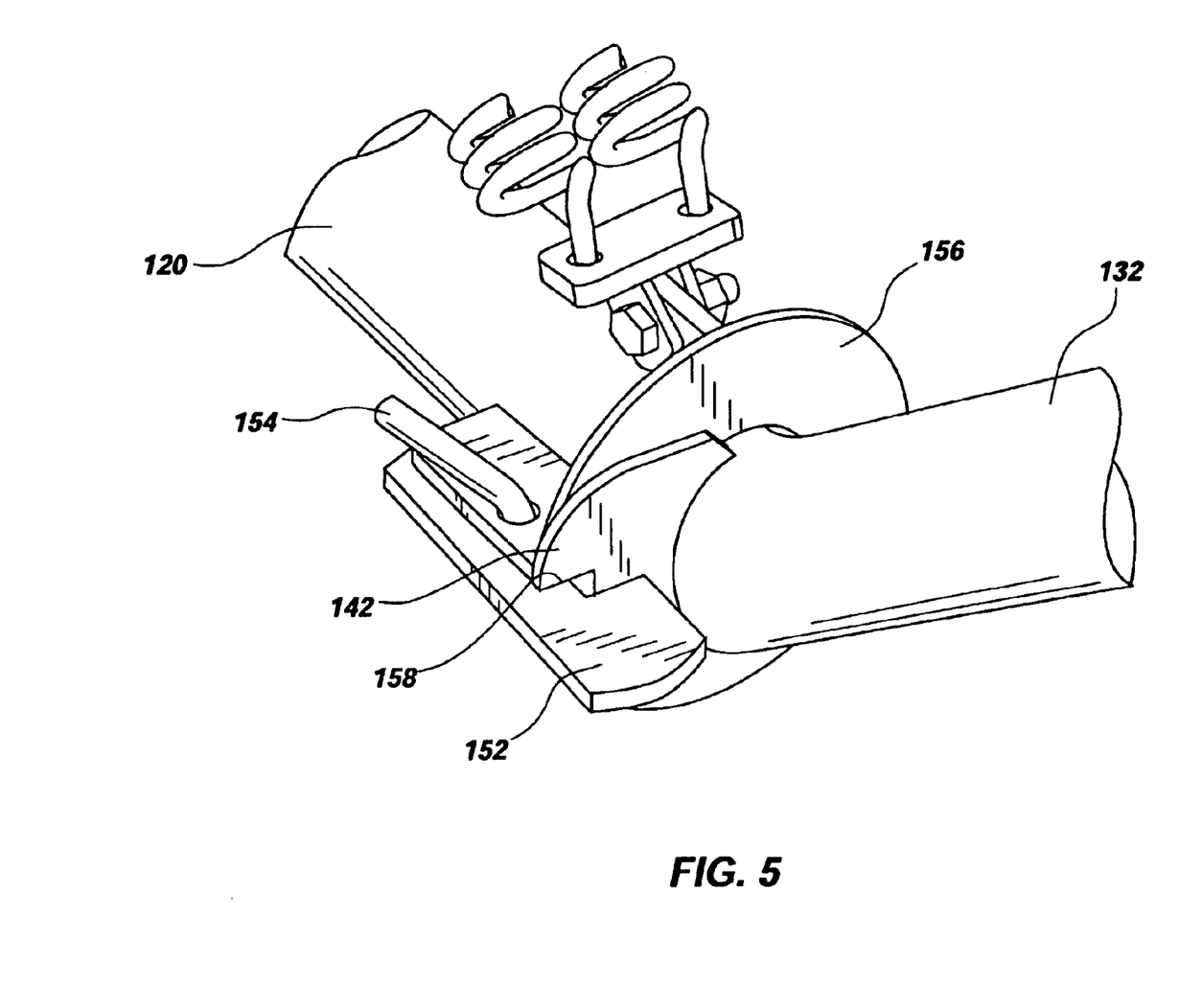
FIG. 5 is a break-away view of one manner in which the exemplary right boom shown in FIGS. 3 and 4 may be coupled to a housing assembly on the frame.

In order to attach the right boom 132 to the frame 102, the free end 140A of the extended portion 140 of the right boom 132 is inserted into the right housing 120 as shown in FIG. 5. The flange 142 abuts against an annular flange 156 on the right housing 120 when the proper insertion depth is reached.

The flange 142 may further comprise a notched portion 158 to thereby engage a locking plate 152. The locking plate 152 may be secured to the right housing 120 by a pin 154. When in place, the locking plate 152 prevents the right boom 132 from coming out of the right housing 120 when in use. Further, the right boom 132 may be removed be removing the pin 154 and the locking plate 152.

It will be appreciated that the right boom 132 preferably attaches to the right housing 120 in a similar manner as the right rake arm 110 did previously. It will be further appreciated that this eliminates any need to modify the frame 102 to accept the right boom 132. It must also be noted, however, that both the left boom 130 and the right boom 132 may be attached in any manner, including, without limitation, welding and bolting.

It will be appreciated that the structure and apparatus disclosed herein is merely one example of a means for attaching the booms to the frame, and it should be appreciated that any structure, apparatus or system for attaching the booms to the frame which performs functions the same as, or equivalent to, those disclosed herein are intended to fall within the scope of a means for attaching the booms to the frame, including those structures, apparatus or systems for attaching the booms to the frame which are presently known, or which may become available in the future. Anything that functions the same as, or equivalently to, a means for attaching the booms to the frame falls within the scope of this element.

Figure 6:
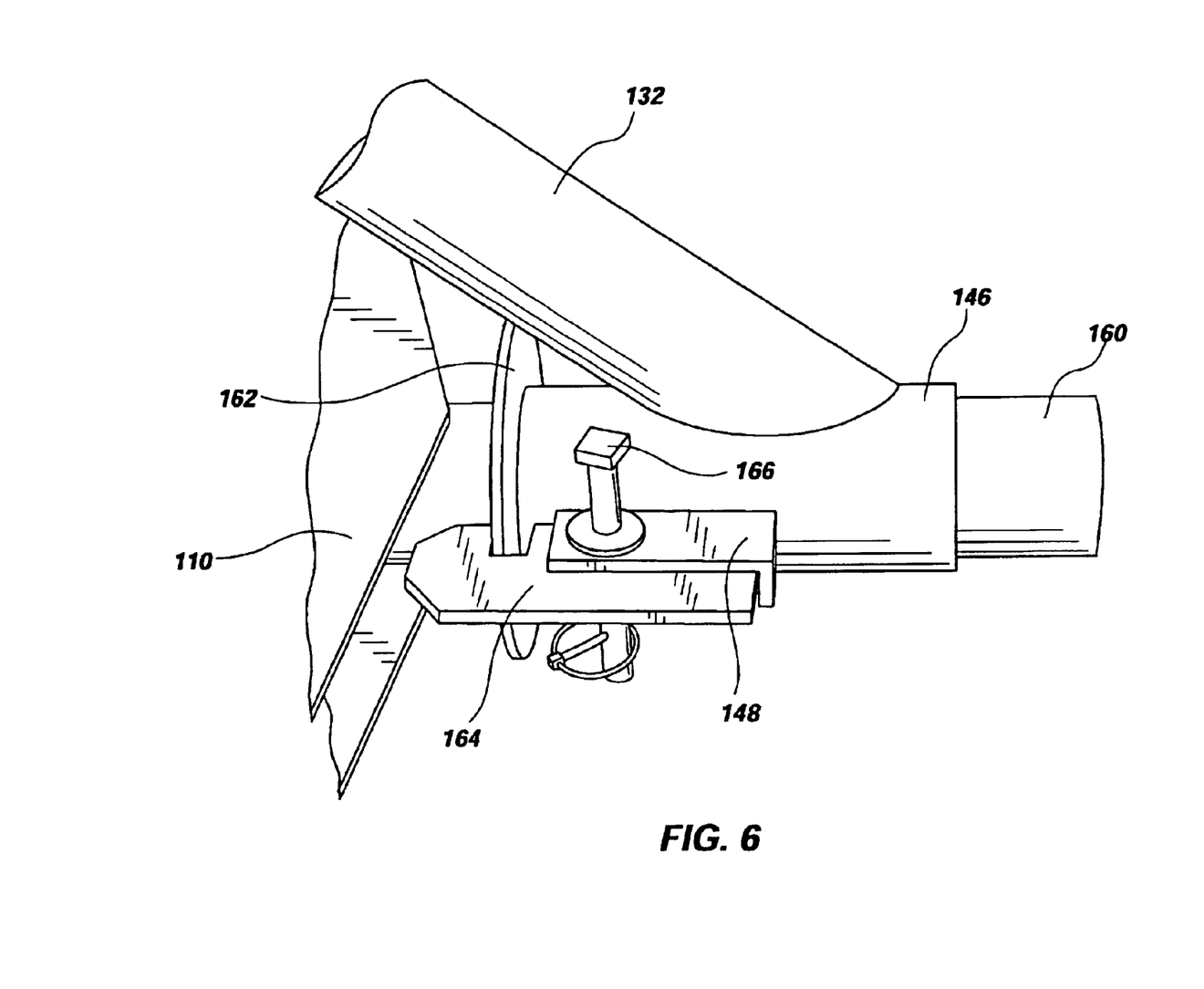
FIG. 6 is a break-away view of one manner in which a rake arm may be attached to the exemplary right boom shown in FIGS. 3 and 4.

In order to attach the right rake arm 110 to the right boom 132, the boom housing 146 of the right boom 132 may accept an extended portion 160 of the right rake arm 110 as shown in FIG. 6. The extended portion 160 of the right rake arm 110 is slid into the boom housing 146. A locking plate 164 coupled to the bracket 148 on the boom housing 146 by a pin 166 that engages an annular flange 162 on the right rake arm 110. In this manner, the locking plate 164 removably secures the right rake arm 110 to the boom housing 146. Further, it will be appreciated that the right rake arm 110 may be coupled to the right boom 132 without significant modification to the right rake arm 110. It should be noted, that the right rake arm 110 may be coupled to the right boom 132 by any manner, including welding or bolting.

It will be appreciated that the structure and apparatus disclosed herein is merely one example of a means for attaching the rake arms to the booms, and it should be appreciated that any structure, apparatus or system for attaching the rake arms to the booms which performs functions the same as, or equivalent to, those disclosed herein are intended to fall within the scope of a means for attaching the rake arms to the booms, including those structures, apparatus or systems for attaching the rake arms to the booms which are presently known, or which may become available in the future. Anything which functions the same as, or equivalently to, a means for attaching the rake arms to the booms falls within the scope of this element.

Referring now back to FIG. 2, as discussed above, both the left boom 130 and the right boom 132 may each comprise a cantilevered arm 134. The cantilevered arms 134 may extend outwardly from their respective booms. The free ends 134A of each of the cantilevered arms 134 may be attached to a brace member 136. The brace member 136 is attached to the frame 102. The brace member 136 provides additional support to the left boom 130 and the right boom 132.

Figure 7:
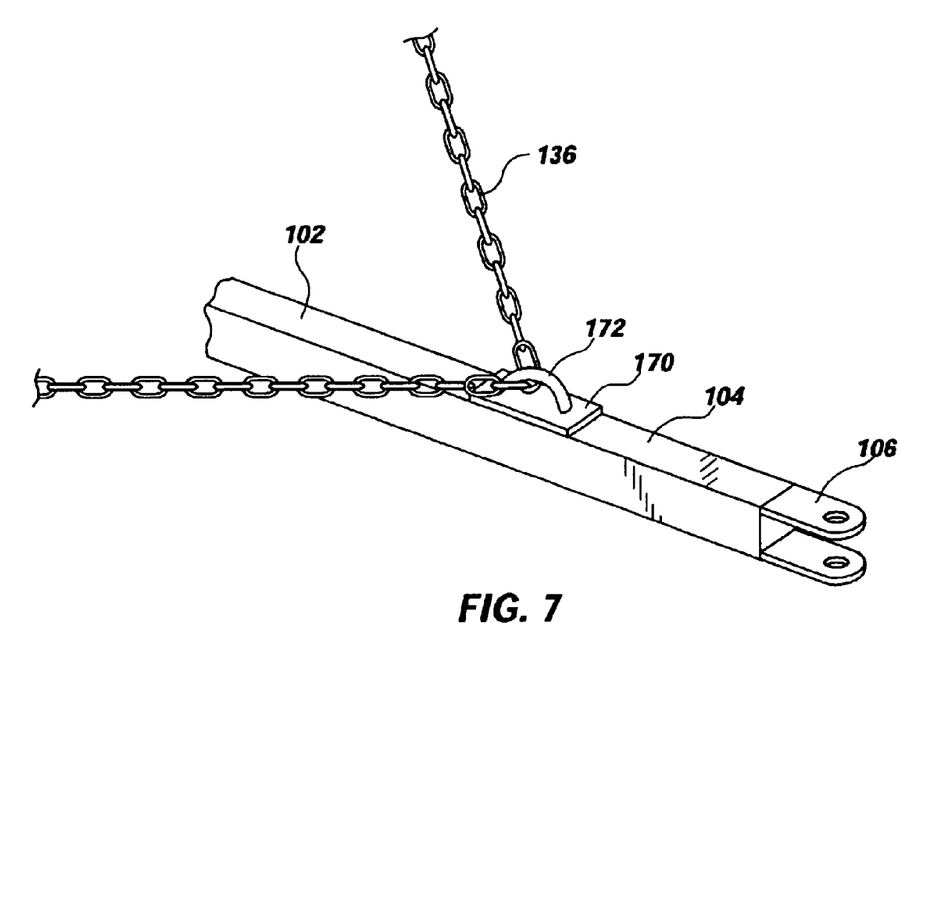
FIG. 7 is a break-way view of a bracket providing a point of attachment for a brace member.

As shown in FIG. 7, the brace member 136 may comprise a continuous chain attached to the tongue 104 of the frame 102 through a bracket 170. The bracket 170 may be welded or bolted to the tongue 104 near the hitch 106. The bracket 170 may allow the brace member 136 to slide through an eyelet 172 and then locked in place with a hook. The brace member 136 may also comprise an elongated piece of metal, a rope, a nylon strap, a chain or a cable. It should be noted that the use of the brace member 136 and cantilevered arms 134 may not necessarily be required for use with the present invention.

Figure 7A:
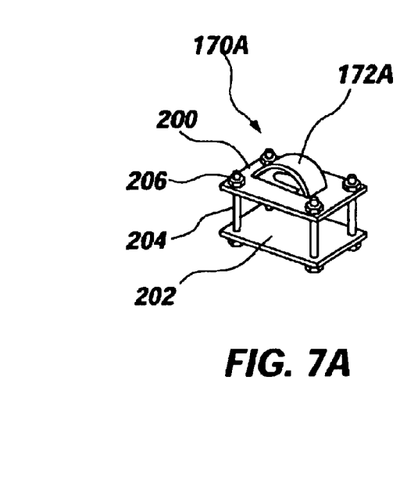
FIG. 7A illustrates an alternative embodiment of a bracket for providing a point of attachment for a brace member.

FIG. 7A illustrates an alternative bracket 170A having a top plate 200 and a bottom plate 202 which is configured to be bolted on the frame 104 using a bolts 204 and nuts 206.

It will be appreciated that the structure and apparatus disclosed herein is merely one example of a means for stabilizing the booms and rake arms when in use, and it should be appreciated that any structure, apparatus or system for stabilizing the booms and rake arms when in use which performs functions the same as, or equivalent to, those disclosed herein are intended to fall within the scope of a means for stabilizing the booms and rake arms when in use, including those structures, apparatus or systems for stabilizing the booms and rake arms when in use which are presently known, or which may become available in the future. Anything that functions the same as, or equivalently to, a means for stabilizing the booms and rake arms when in use falls within the scope of this element.

It will be appreciated that the use of the present invention allows most standard hay rakes to be converted to an improved configuration. It is also within the scope of this invention to manufacture a new hay rake in accordance with the principles of the present invention as shown and described above.

Those having ordinary skill in the relevant art will appreciate the advantages provided by the features of the present invention. For example, it is a feature of the present invention to provide a conversion kit for reorienting the rake arms of an existing standard hay rake such that the rotating tined wheels are supported from their trailing faces. It is another feature of the present invention to provide a hay rake with two booms to which the rake arms may be attached.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The subject matter claimed is:

1. A conversion kit for reconfiguring a hay rake, said hay rake comprising a frame, two rake arms disposed on the frame, a plurality of rotating tined wheels disposed on said rake arms, each of the plurality of rotating tined wheels having a leading face and a trailing face, said conversion kit comprising:

a left boom comprising a first end and a second end, said first end configured to be attached to said frame in place of one of the rake arms and said second end providing an alternative point of attachment for one of the rake arms;

a right boom comprising a first end and a second end, said first end configured to be attached to said frame in place of one of the rake arms and said second end providing an alternative point of attachment for one of the rake arms; and wherein said left and right booms are interposable between said frame and rake arms such that when said left and right booms are interposed between said frame and rake arms each of the plurality of rotating tined wheels is supported from its trailing face.

2. The conversion kit of claim 1 wherein the left and right booms each further comprises a cantilevered arm, said cantilevered arm configured to be attached to a brace member to stabilize its respective boom, said brace member also being attached to said frame.

3. The conversion kit of claim 2 wherein the brace member is selected from the group consisting of an elongated piece of metal, a rope, a nylon strap, a chain and a cable.

4. The conversion kit of claim 1 wherein the left and the right booms each extend upwardly from the first end to an apex and then downwardly to the second end such that each boom passes over the rake arm attached to its second end when installed on said frame.

5. The conversion kit of claim 4 wherein the left and right booms comprise tubular metal.

6. The conversion kit of claim 5 wherein the left and right booms each further comprise a support brace disposed at the apex.

7. The conversion kit of claim 5 wherein the left and right booms each further comprise a cantilevered arm, said cantilevered arm configured to be attached to a brace member to stabilize its respective boom, said brace member also being attached to said frame.

8. The conversion kit of claim 7 wherein the brace member is selected from the group consisting of an elongated piece of metal, a rope, a nylon strap, a chain and a cable.

9. The conversion kit of claim 5 wherein the first end of each of the booms comprises an extended portion whereby each of the booms is coupled to said frame when the extended portion is inserted into an housing on the frame.

10. The conversion kit of claim 9 wherein the extended portion further comprises a flange whereby each of the booms is locked in place when the flange engages a locking plate coupled to said housing.

11. The conversion kit of claim 10 wherein the locking plate is coupled to said housing by a pin.

12. The conversion kit of claim 9 wherein the second end of each of the booms comprises a housing adapted to receive an extended portion of a rake arm.

13. The conversion kit of claim 12 wherein the housing further comprises a flange whereby a locking plate selectively secures the rake arm to the boom, said locking plate engaging the flange on the housing of the boom as well as a flange on the rake arm.

14. A conversion kit for reconfiguring a hay rake, said hay rake comprising a frame, two rake arms disposed on the frame, a plurality of rotating tined wheels disposed on said rake arms, each of the plurality of rotating tined wheels having a leading face and a trailing face, said conversion kit comprising:
    a left boom comprising a first end and a second end, said first end configured to be attached to said frame in place of one of the rake arms and said second end providing an alternative point of attachment for one of the rake arms;
    a right boom comprising a first end and a second end, said first end configured to be attached to said frame in place of one of the rake arms and said second end providing an alternative point of attachment for one of the rake arms; and
    wherein said left and right booms are interposable between said frame and rake arms such that when said left and right booms are interposed between said frame and rake arms each of the plurality of rotating tined wheels is supported from its trailing face and both the left and right booms pass over the rake arm attached to their second ends.

15. The conversion kit of claim 14 wherein the left and right booms each further comprise a cantilevered arm having an attached end and a free end, said free end configured to be attached to a brace member to stabilize its respective boom, said brace member also being attached to said frame.

16. The conversion kit of claim 15 wherein the brace member is selected from the group consisting of an elongated piece of metal, a rope, a nylon strap, a chain and a cable.

17. The conversion kit of claim 14 wherein the frame further comprises a left and a right housing, said housings each having a hollow interior, said first ends of said left and right booms further comprising an extended portion, said left and right housings each receiving the extended portion of the left and right booms, respectively, when said booms are removably attached to said frame.

18. The conversion kit of claim 17 wherein the extended portion of the left and the right booms each further comprises a flange, a locking plate coupled to said left or right housings engaging said flange to hold its respective boom in place.

19. The conversion kit of claim 18 wherein the second ends of the left and the right booms further comprises a housing for receiving an extended portion of one of the rake arms.

20. The conversion kit of claim 14 wherein said left and right booms comprise tubular metal.

21. The conversion kit of claim 20 wherein the left and the right booms each extend upwardly from the first end to an apex and then downwardly to the second end such that the left and the right booms pass over the rake arm attached to their second ends when installed on said frame.

22. The conversion kit of claim 21 wherein the left and the right booms each further comprise a support brace disposed at the apex.

23. The conversion kit of claim 21 wherein the left and the right booms each further comprises a cantilevered arm having an attached end and a free end, said free ends of the cantilevered arms being attached to a chain, said chain also attached to said frame through an eyelet.

24. A conversion kit for reconfiguring a hay rake, said hay rake comprising a frame, two rake arms disposed on the frame, a plurality of rotating tined wheels disposed on said rake arms, each of the plurality of rotating tined wheels having a leading face and a trailing face, said conversion kit comprising:
    a positioning means for reorientating the rake arms, said positioning means comprising left and right booms, each comprising a first end and a second end, wherein each of said left and right booms extends upwardly from the first end to an apex and then downwardly to the second end;
    a first coupling means disposed on each said first end for attaching the positioning means to the frame;
    a second coupling means disposed on each said second end for attaching the rake arms to the positioning means; and
    wherein said positioning means is installable on said frame by said first coupling means and said rake arms are installable on said positioning means by said second coupling means such that each of the rotating tined wheels is supported from its trailing face and such that each of said booms passes over the rake arm attached to its second end when installed on said frame.

25. The conversion kit of claim 24 further comprising a bracing means for stabilizing the positioning means.

26. The conversion kit of claim 24 wherein the first coupling means comprises an extended portion on both the left and the right booms and a left and a right housing on the frame, said extended portions sliding into said housings.

27. The conversion kit of claim 26 wherein the second coupling means comprises a housing on both the left and the right booms and an extended portion on both of the rake arms, the extended portion of the rake arms sliding into said housings.

28. An apparatus for raking cut crops into windrows while being pulled through a field, said apparatus comprising:
    a frame;
    a left boom, said left boom having a first end and a second end, said first end coupled to said frame and said second end coupled to a left rake arm;
    a right boom, said right boom having a first end and a second end, said first end coupled to said frame and said second end coupled to a right rake arm;
    a plurality of rotating tined wheels disposed on said left and right rake arms, each of the plurality of rotating tined wheels having a leading face and a trailing face; and
    wherein both the left and right booms extend from the frame over the respective left or right rake arm attached to their second ends such that each of the rotating tined wheels is supported from its trailing face.

29. The apparatus of claim 28 wherein both the left and the right booms each further comprises a cantilevered arm attached to a brace member, said brace member being attached to said frame.

30. The apparatus of claim 29 wherein the brace member is selected from the group consisting of an elongated piece of metal, a rope, a nylon strap, a chain and a cable.

31. The apparatus of claim 28 wherein both the left and the right booms each extend upwardly from the first end to an apex and then downwardly to the second end such that the left and the right booms pass over the rake arm attached to their second ends.

32. The apparatus of claim 31 wherein both the left and the right booms are removably coupled to the frame and to their respective left or right rake arms.

33. The apparatus of claim 28 wherein the second ends of the left and right booms are free floating.

34. A method for converting a hay rake, said hay rake comprising a frame, a pair of rake arms disposed on said frame, and a plurality of rotating tined wheels disposed on said rake arms, each of the plurality of rotating tined wheels having a leading face and a trailing face, said method comprising the steps of:

removing the pair of rake arms from said frame;

attaching a pair of booms to said frame in place of said pair of rake arms; and reattaching each of the pair of rake arms to one of the booms such that each of the plurality of rotating tined wheels is supported from its trailing face.

35. The method of claim 34 further comprising the step of attaching a brace member to a cantilevered arm extending from each of the pair of booms and to the frame.

36. The method of claim 35 wherein the brace member is selected from the group consisting of an elongated piece of metal, a rope, a nylon strap, a chain and a cable.

37. The method of claim 35 wherein the step of attaching the pair of booms further comprises the step of inserting an extended portion of each of the pair of booms into a housing on said frame.

38. The method of claim 37 wherein the step of reattaching each of the pair of rake arms comprises the step of inserting an extended portion of each of the pair of rake arms into a boom housing disposed on one of the pair of booms.

39. The method of claim 38 further comprising the step of attaching a brace member to a cantilevered arm extending from each of the pair of booms and to the frame.

* * * * *

UNITED STATES PATENT AND TRADEMARK OFFICE
CERTIFICATE OF CORRECTION

PATENT NO.     : 6,823,656 B1
DATED          : November 30, 2004
INVENTOR(S)    : Neal H. Domgaard It is certified that error appears in the above-identified patent and that said Letters Patent is hereby corrected as shown below:

Column 2,
Line 28, "break-way" should read -- break-away --.

Column 3,
Line 5, "from trailing face" should read -- from the trailing face --.
Line 65, "the, right" should read -- the right --.

Column 4,
Line 32, "towards" should read -- toward --.
Line 55, "side which" should read -- side on which --.

Column 6,
Line 24, "removed be removing" should read -- removed by removing --.

Column 7,
Line 30, "using a bolts 204" should read -- using bolts 204 --.

Signed and Sealed this

Sixteenth Day of August, 2005

JON W. DUDAS
*Director of the United States Patent and Trademark Office*